United States Patent [19]
Saita

[11] Patent Number: 5,327,986
[45] Date of Patent: Jul. 12, 1994

[54] ELECTRIC MOTOR DRIVE-TYPE POWER STEERING SYSTEM

[75] Inventor: Norihiro Saita, Atsugi, Japan

[73] Assignee: Unisia Jecs Corporation, Atsugi, Japan

[21] Appl. No.: 10,809

[22] Filed: Jan. 29, 1993

[30] Foreign Application Priority Data

Feb. 4, 1992 [JP] Japan .................. 4-3721[U]

[51] Int. Cl.$^5$ .............................................. B62D 5/04
[52] U.S. Cl. .................... 180/79.1; 180/143; 74/661
[58] Field of Search ............ 180/79.1, 69.6, 143, 180/148; 74/661, 499

[56] References Cited

U.S. PATENT DOCUMENTS

| | | | |
|---|---|---|---|
| 4,484,871 | 11/1984 | Adman | 74/661 |
| 4,577,738 | 3/1986 | Yater | 74/661 |
| 4,686,433 | 8/1987 | Shimizu | 180/79.1 |
| 5,040,630 | 8/1991 | Morishita et al. | 180/79.1 |
| 5,195,623 | 3/1993 | Sommers | 74/661 |

FOREIGN PATENT DOCUMENTS

| | | | |
|---|---|---|---|
| 0162329 | 12/1979 | Japan | 180/69.6 |
| 61-110668 | 5/1986 | Japan | |
| 0137269 | 6/1987 | Japan | 180/79.1 |

Primary Examiner—Margaret A. Focarino
Assistant Examiner—Anne Marie Boehler
Attorney, Agent, or Firm—Foley & Lardner

[57] ABSTRACT

An electric motor drive-type power steering system includes a steering gear, a first motor constantly connected to the steering gear for supplying thereto a steering assist force, and a second motor connectable to the steering gear by way of an electromagnetic clutch for selectively supplying a steering assist force to the steering gear in addition to the steering assist force by the first motor. The first and second motors and the electromagnetic clutch are controlled so that both of the first and second motors are put into action when the vehicle speed is lower than a predetermined value and only the first motor is put into action when the vehicle speed is higher than the above mentioned predetermined value. The first motor is of a smaller maximum output type as compared with the second motor.

5 Claims, 4 Drawing Sheets

ELECTRIC MOTOR DRIVE-TYPE POWER STEERING SYSTEM

BACKGROUND OF THE INVENTION

1. Field of the Invention

The present invention relates in general to power steering systems for automotive vehicles and more particularly to an electric motor drive-type power steering system having an electric motor for supplying a steering assist force to a steering gear for thereby multiplying a steering effort applied to the steering gear by way of a steering wheel.

2. Disclosure Information

Heretofore, the power steering systems of the hydraulic pump drive-type were mainly used. However, many of the power steering systems produced by various car makers these days are of the electric motor drive-type as disclosed in Japanese Provisional Publication No. 61-110668. For example, the power steering system is provided with sensors for detecting the steering effort applied to the steering wheel and the vehicle and supplying signals representative thereof to the controller so as to control increase and decrease of a steering assist force to be supplied from the electric motor to the steering gear in accordance with the steering effort and the vehicle speed.

The prior art electric motor drive-type power steering system is adapted to multiply the steering effort by using a single electric motor and for this reason has the following problems.

At low vehicle speed such as the case when the vehicle starts from a standstill condition (vehicle speed is zero), the reactions transferred from the road wheels to the steering gear are large so that a high output motor is necessitated for meeting the requirement of large steering assist force.

At middle to high vehicle speed, the reactions transferred from the road wheels to the steering gear are not so large, so a low output motor can be used at low to middle vehicle speed. However, in order to meet the requirement at low vehicle speed it has been the practice to utilize a high output motor also at middle to high vehicle speed. The high output motor however has a large rotational inertia and therefore has a problem of being poor in responsiveness, particularly when the direction of turning of the steering wheel is changed, that is, the direction of steering the vehicle is changed.

SUMMARY OF THE INVENTION

In accordance with the present invention, there is provided an improved power steering system for a vehicle, which comprises a steering gear, a first motor constantly connected to the steering gear for supplying thereto a steering assist force, a second motor for supplying a steering assist force to the steering gear, an electromagnetic clutch interposed between the second motor and the steering gear for providing selective driving connection therebetween, sensor means for detecting a vehicle speed and producing a signal representative thereof, control means for controlling the operations of the first and second motors and the engagement and disengagement of the electromagnetic clutch on the basis of the signal from the sensor means, wherein the control means has means for causing both of the first and second motors to be put into action when the vehicle speed is lower than a predetermined value and for causing only the first motor to be put into action when the vehicle speed is higher than the above mentioned predetermined value.

The above structure is effective for overcoming the above noted drawbacks or shortcomings inherent in the prior art system.

It is accordingly an object of the present invention to provide an improved electric motor drive-type power steering system which can provide, with assuredness and with good responsiveness, a desired steering assist force throughout low to high vehicle speed.

It is another object of the present invention to provide an improved electric motor drive-type power steering system which can reduce the electrical consumption.

DETAILED DESCRIPTION OF THE PREFERRED EMBODIMENTS

Figure 1:
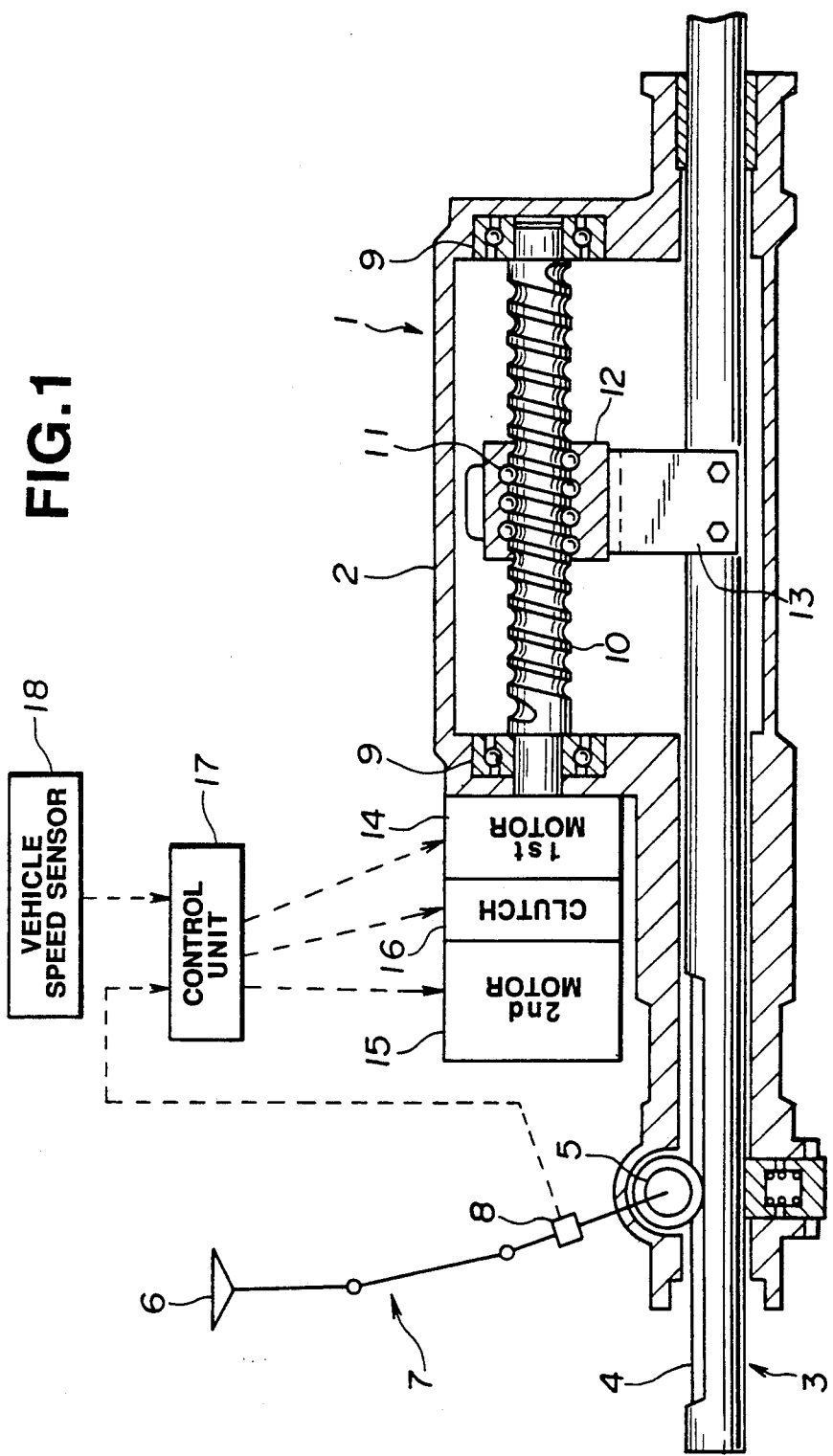
FIG. 1 is a sectional view of an electric motor-drive type power steering system, with a diagrammatic representation of a control section.

Referring first to FIG. 1, a power steering system includes a rack and pinion type steering gear 1 having a casing 2, a drive shaft 3 axially and movably supported on the casing 2 and formed with a rack 4, and a pinion 5 meshed with the rack 4. The pinion 5 is drivingly connected to a steering wheel 6 by way of a mechanical drive line 7. A torque sensor 8 is provided to the drive line 7 for detecting the torque thereof, i.e., for detecting a steering effort applied to the steering wheel 6. A worm shaft 10 is arranged in parallel to rack shaft 3 and rotatably supported at opposite ends on the casing 2 by means of bearings 9. A ball nut 12 is meshed with the worm shaft 10 by way of circulating balls 13 in such a manner as to be capable of traveling on the worm shaft 10. A motion transmitting member 13 interconnects the rack shaft 3 and the ball nut 12 in such a manner as to be capable of transmitting travel of the ball nut 12 to the rack shaft 13.

The power steering system 1 is further provided with a first electric motor 14, a second electric motor 15, an electromagnetic clutch 16 interposed between the first and second motors 14 and 15 in such a manner as to be capable of drivingly connecting and disconnecting the second motor 15 to and from the first motor 14, a control unit 17 and a vehicle speed sensor 18. The first and second electric motors 14 and 15 are of the different types capable of producing different maximum outputs, i.e., the first motor 14 is of a smaller maximum output type as compared with the second motor 15.

Figure 2:
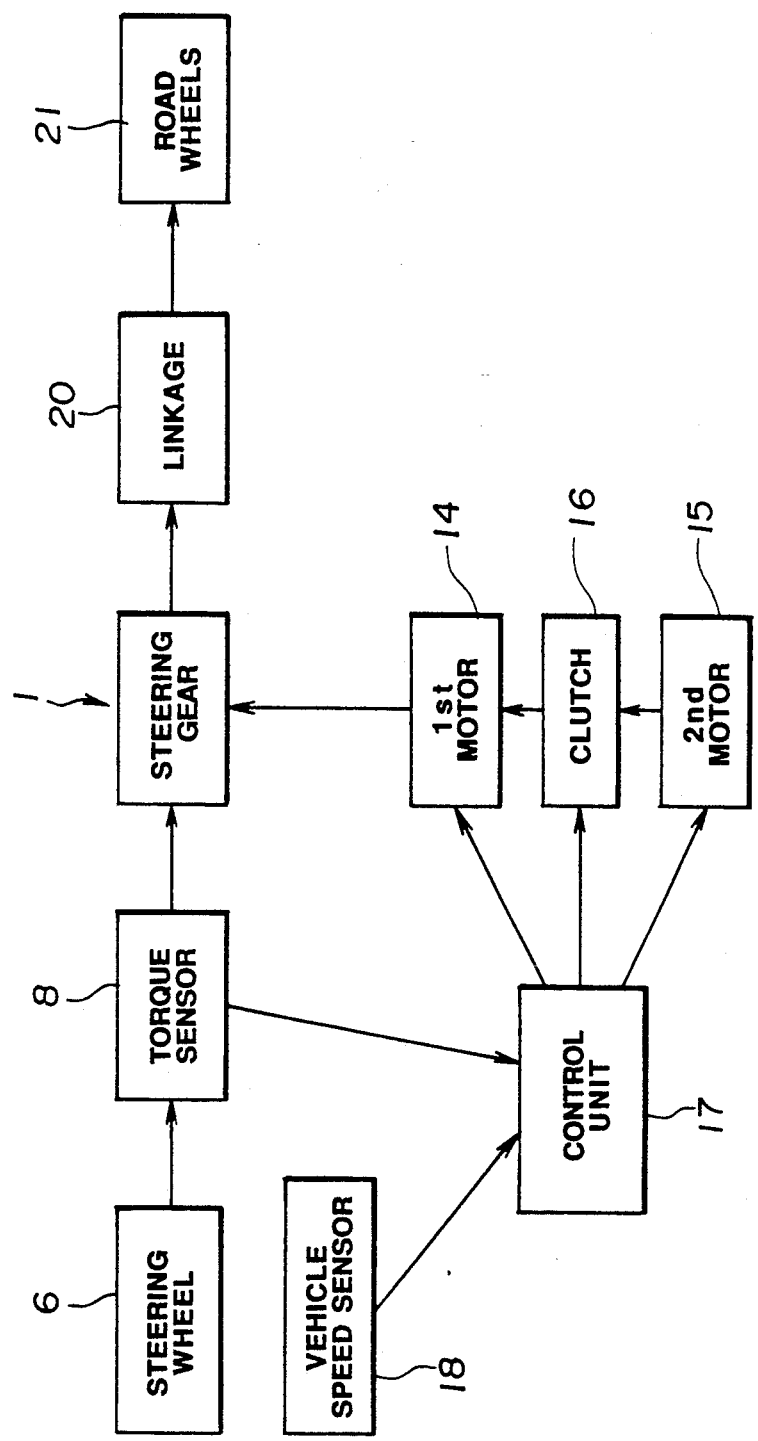
FIG. 2 is a diagrammatic representation of the power steering system of FIG. 1.

FIG. 2 is a block diagram for explanation of the operations of the power steering system of this invention, wherein the steering effort received by the steering gear 1 is transmitted by way of a well-known linkage 20 to road wheels 21.

Referring to FIG. 3, the operation of the electric motor drive-type power steering system of this invention will be described.

Figure 3A:
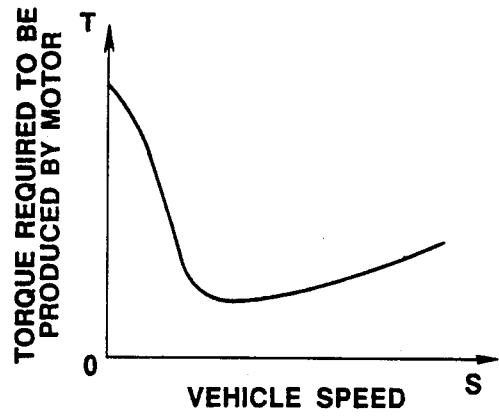
FIG. 3A is a graph showing a relation between a vehicle speed and a steering assist force or torque to be produced by motors according to an embodiment of the present invention.
Figure 3B:
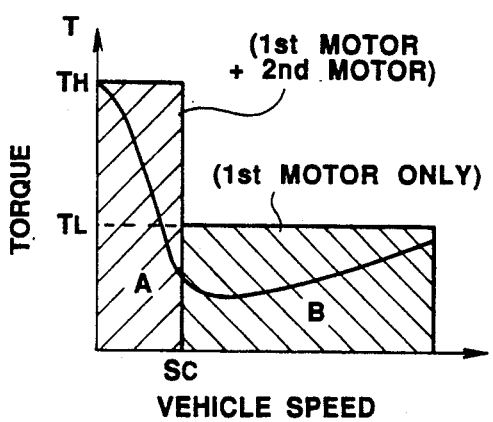
FIG. 3B is a graph showing the operation zones of two motors relative to vehicle speed according to an embodiment of the present invention.
Figure 3C:
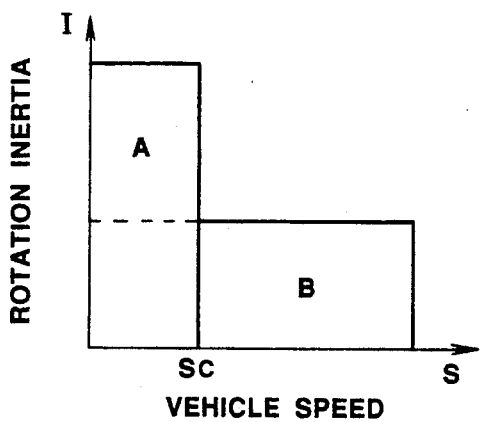
FIG. 3C is a graph showing the relation of the rotational inertia of motors and the vehicle speed.
Figure 3D:
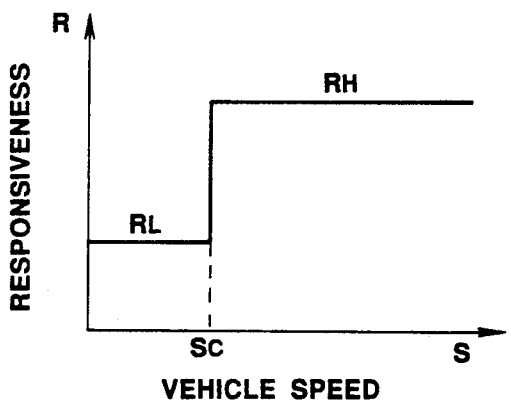
FIG. 3D is a graph showing the relation between the responsiveness of motor and the vehicle speed.

Firstly, the relation between the vehicle speed S and the steering assist torque or force T required to be produced by the motors 14 and 15 for assistance to turning of the steering wheel 6 is represented by the curve shown in the graph of FIG. 3A. Such a relation is attained by controlling the operation of the electromagnetic clutch 16 on the basis of the signals from the torque sensor 8 and the vehicle speed sensor 18, that is, when the vehicle starts running after stoppage where the largest steering assist force is required, the clutch 16 is turned on so that the first and second motors 14 and 15 are directly connected to each other. When the vehicle speed S increases up to Sc in FIG. 3B for instance, the clutch 16 is turned off so as to keep only the first motor 15 in action and this condition is kept at higher vehicle speed. When the vehicle speed reduces from middle to high speed to low speed, the clutch 16 is turned on when the vehicle speed reduces down to Sc. In the above manner, in a low vehicle speed range indicated by "A" in FIG. 3B a large steering assist torque or force TH is supplied to the power steering 1 and in a middle to high vehicle speed range indicated by "B" in FIG. 3B a small steering assist torque or force TL is supplied.

While in the power steering system described as above the operation of the clutch 16 is controlled on the basis of vehicle speed only, this is not for the purpose of limitation. For example, the operation of the clutch 16 may be controlled on the basis of both the steering effort and the vehicle speed.

Figure 4:
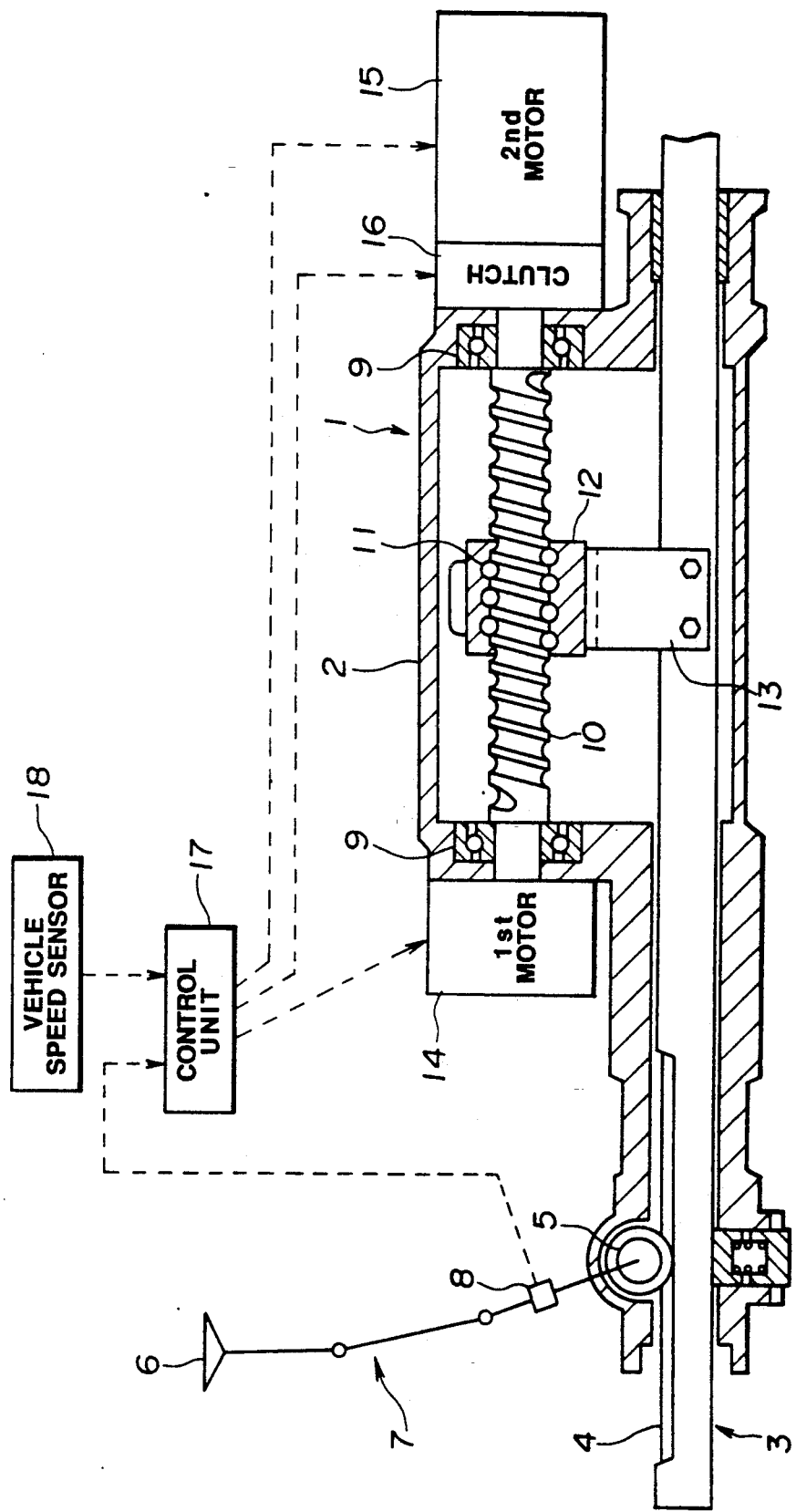
FIG. 4 is a view similar to FIG. 2 but shows another embodiment of the present invention.

FIG. 4 shows another embodiment which differs from the previous embodiment in that the worm shaft 10 is drivingly connected at an end to the first motor 14 and at the other end to the second motor 15 by way of the electromagnetic clutch 16. Except for the above, this embodiment is substantially similar to the previous embodiment and can produce substantially the same effect.

From the foregoing, it will be understood that by selective usage of one of or both of two electric motors of different maximum outputs it becomes possible to attain a required steering assist force with a good responsiveness at any time from low to high vehicle speed condition.

It will be further understood that by using one of or both of the motors in accordance with the necessity consumption of the electric power can be smaller and furthermore the current for operating the control circuit can be smaller, thus making it possible to utilize EET transistors of a smaller capacity and therefore of a smaller emission of heat.

It will be further understood that although two motors are used, either of them can be sized smaller as compared with one in a comparable prior art system.

What is claimed is:

1. A power steering system for a vehicle comprising:
   a steering gear;
   a first motor constantly connected to said steering gear for supplying thereto a steering assist force;
   a second motor for supplying a steering assist force to said steering gear;
   an electromagnetic clutch interposed between said second motor and said steering gear for providing selective driving connection therebetween;
   sensor means for detecting a vehicle speed and producing a signal representative thereof;
   control means for controlling the operations of said first and second motors and the engagement and disengagement of said electromagnetic clutch on the basis of the signal from said vehicle speed sensor;
   said control means having means for causing both of said first and second motors to be put into action when the vehicle speed is lower than a predetermined value and for causing only said first motor to be put into action when the vehicle speed is higher than said predetermined value.

2. A power steering system according to claim 1, wherein said steering gear includes a pinion drivingly connected to a steering wheel, a rack meshed with said pinion, a worm shaft in parallel to said rack, a ball nut installed on said worm shaft for axial movement thereon, and a motion transmitting member for transmitting motion of said ball nut to said rack, and wherein said first and second motors and said electromagnetic clutch are connected to an axial end of said worm shaft.

3. A power steering system for a vehicle comprising:
   a steering gear;
   a first motor constantly connected to said steering gear for supplying thereto a steering assist force;
   a second motor for supplying a steering assist force to said steering gear;
   an electromagnetic clutch interposed between said second motor and said steering gear for providing selective driving connection therebetween;
   sensor means for detecting a vehicle speed and producing a signal representative thereof;
   control means for controlling the operations of said first and second motors and the engagement and disengagement of said electromagnetic clutch on the basis of the signal from said vehicle speed sensor;
   said control means having means for causing both of said first and second motors to be put into action when the vehicle speed is lower than a predetermined value and for causing only said first motor to be put into action when the vehicle speed is higher than said predetermined value;
   wherein said steering gear includes a pinion drivingly connected to a steering wheel, a rack meshed with said pinion, a worm shaft in parallel to said rack, a ball nut installed on said worm shaft for axial movement thereon, and a motion transmitting member for transmitting motion of said ball nut to said rack, and wherein said first motor is connected to an end of said worm shaft whilst said second motor and said electromagnetic clutch are connected to another axial end of said worm shaft.

4. A power steering system according to claim 1, wherein said first and second motors produce different maximum outputs.

5. A power steering system according to claim 4, wherein said first motor produces a smaller maximum output as compared with said second motor.

* * * * *